B. CLARUS.
AUTOMATIC PISTOL.
APPLICATION FILED DEC. 10, 1907.
929,286.
Patented July 27, 190
2 SHEETS—SHEET
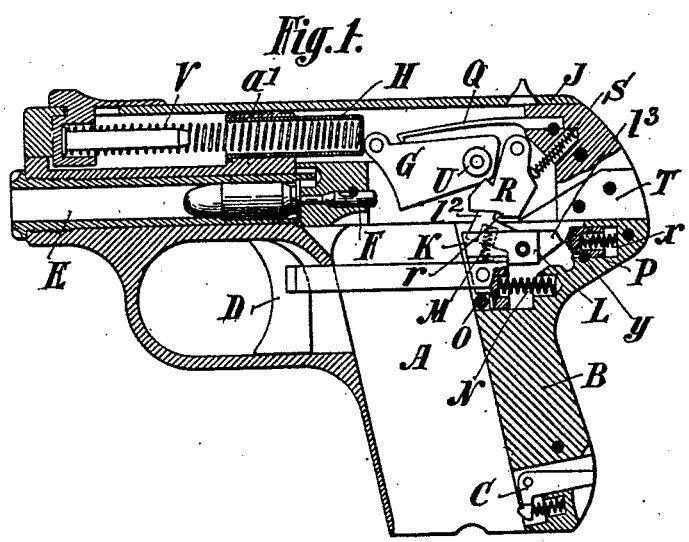
Fig.1.
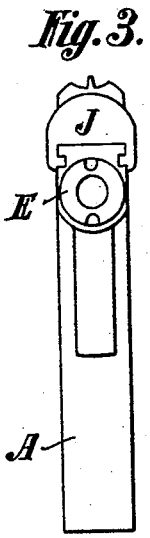
Fig.3.
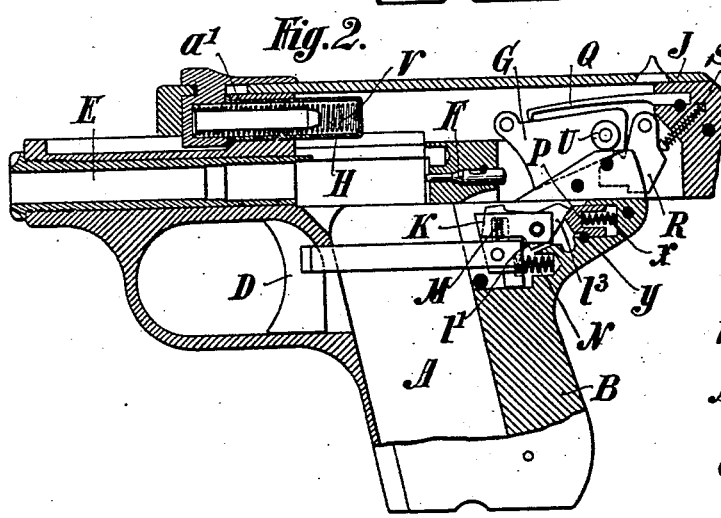
Fig.2.
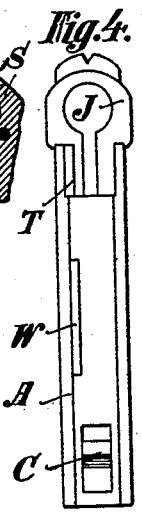
Fig.4.
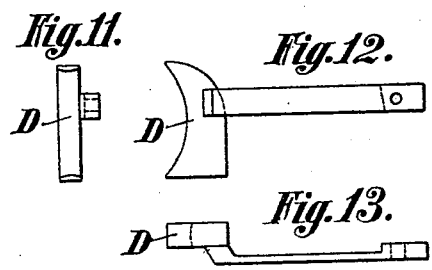
Fig.11. Fig.12.
Fig.13.
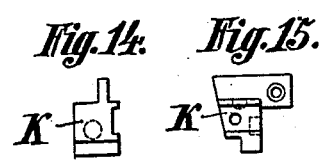
Fig.14. Fig.15.
Fig.16.
WITNESSES:
Fred White
René Meine
INVENTO
Bruno Clar
By Attorneys.

B. CLARUS.
AUTOMATIC PISTOL.
APPLICATION FILED DEC. 10, 1907.
929,286.
Patented July 27, 1909.
2 SHEETS—SHEET
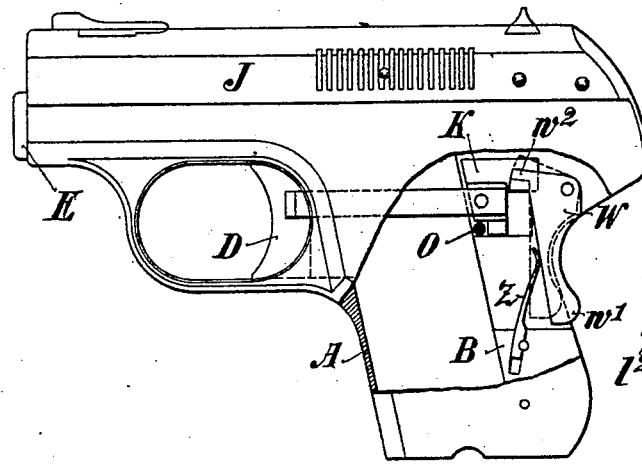
Fig. 5.
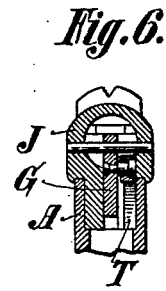
Fig. 6.
Fig. 17. Fig. 18.
Fig. 19.
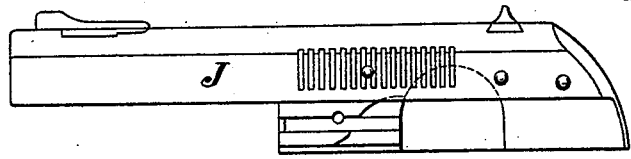
Fig. 7.
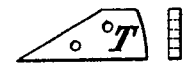
Fig. 20. Fig. 21.
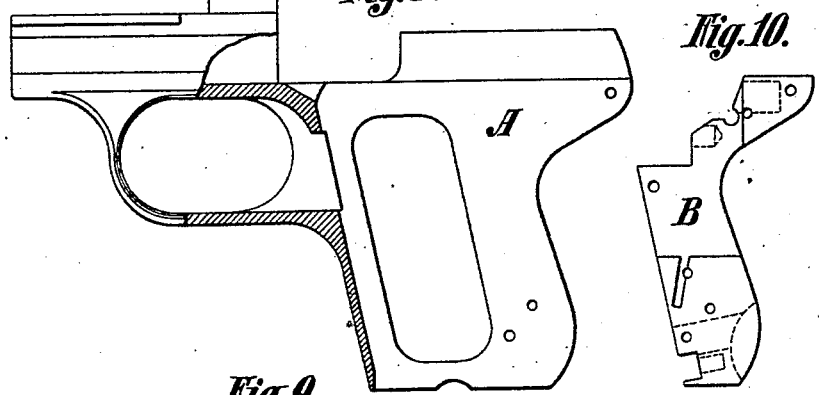
Fig. 8.
Fig. 10.
Fig. 9.
WITNESSES:
Fred White
René Bruine
INVENTOR
Bruno Clarus
By Attorneys

UNITED STATES PATENT OFFICE.

BRUNO CLARUS, OF LIEGE, BELGIUM.

AUTOMATIC PISTOL.

No. 929,286.  Specification of Letters Patent.  Patented July 27, 19

Application filed December 10, 1907. Serial No. 405,849.

*To all whom it may concern:*

Be it known that I, BRUNO CLARUS, a subject of the German Emperor, residing at No. 20 Rue des Armuriers, Liege, Belgium, have invented certain new and useful Improvements in Automatic Pistols, of which the following is a full, clear, and exact description.

This invention relates to an automatic pistol, the construction of which insures more advantageous manufacture and simplifies the assembling of the mechanism.

Hitherto designers of weapons have only placed the firing pin in the movable part of their pistols, namely, the so-called "breech slide", while they arranged the firing mechanism and the hammer with its trigger mechanism in the fixed part, generally known as the stock.

The sear releasing arm of hammerless pistols was put in the fixed part and the same was provided with a stop for the purpose of holding the firing pin. This frequently used latter arrangement has many disadvantages, especially with regard to the safety of the weapon. The firing pin, mounted with a certain amount of unavoidable play in the breech slide, is prevented from advancing by the nose of the sear releasing arm which is rigidly mounted in the stock. Considering that the nose of the sear releasing arm only holds back the firing pin by touching a surface a few tenths of a millimeter high, and considering the play between the fixed and movable part of the pistol, it is obvious that the height of the surface which actually holds back the firing pin is reduced to a minimum, especially if a light trigger is desired. It is this that causes the frequent accidents due to accidental automatic firing of the weapon.

With the latter construction as well as that with a hammer, further intermediate members are necessary for preventing the cartridge from being accidentally fired before the cartridge chamber has been entirely closed by the breech bolt. These special arrangements do not exist in the present invention, and all the above mentioned disadvantages are obviated by this construction, especially by the hammer and sear being in the movable part.

The breech slide contains the whole of the firing mechanism, while the stock only contains the trigger mechanism. It is thus sible to assemble each mechanism separa whereby an easy, supervised control i sured.

The accompanying drawings show present arrangement applied to a p which is easily carried in the pocket.

Figure 1 is a longitudinal section thr the firing mechanism with the han cocked ready to fire off the cartridge. I shows the mechanism in the position v it assumes after the breech slide has m back. Fig. 3 is a front view. Fig. 4 rear view which shows the position o automatic safety lever and the incline o1 which serves to cock the hammer. F shows the arrangement of the auto1 safety. Fig. 6 is a cross section which s the arrangement of the hammer wit roller. Fig. 7 shows the breech slide Fig. 8 the stock. Fig. 9 is a plan o stock. Fig. 10 shows the rear or inter1 ate piece. Figs. 11 to 13 show the trigge Figs. 14 to 16 the sear releasing arm ca Figs. 17 to 19 show the sear releasing and Figs. 20 and 21 show the incline o1 which cocks the hammer when the b slide recedes. The same is riveted t left hand side of the stock.

The two main parts of the pistol sho the accompanying drawings are the stc a fixed part, and the breech slide as a able part.

The stock A (Figs. 8, 9) is forged fro: piece for the sake of easy working. T termediate rear portion of the stock, ε in Fig. 10, is formed of one special p; which is introduced at the rear whe parts are being assembled and thu: forms the connecting member of the si the stock A. This intermediate pi contains the bearing for the magazine C with its spring, as well as a bearing f spring of the trigger D with the whole mechanism of the latter.

The intermediate piece B may be co ed with the stock A in any manner d In this fact lies the great advantage arrangement in practice.

The stock A receives a magazine of construction. The barrel bore m: formed in the upper part of the stock facilitating the working, however, a bearing is bored out in the consti shown, into which bearing the exchangeable barrel E is screwed.

The inner left hand side of the stock A carries an incline or cam surface T (Figs. 20 and 21) which serves to cock the hammer. This incline or cam might also be made integral with the stock. In order, however, to facilitate the manufacture, it is made as a separate part which is screwed or riveted to the stock.

The stock A is provided with grooves which are adapted to guide the breech slide. At the upper part a sleeve or eye $a^1$ is provided, which receives the spring housing H, and the stop pin of the breech slide J.

The trigger mechanism consists of the trigger D and the sear releasing arm carrier K which is connected with the former by rivets. The sear releasing arm carrier carries the sear releasing arm L and the spring M. The trigger D moves in a longitudinal direction and is pushed back to its original position by the trigger spring N. The pin O serves as a stop for the movement of the trigger D.

In the intermediate piece B of the stock A is a pressure stud P for the sear releasing lever. This pressure stud P is under the influence of the spring $x$ which continually presses it forward. The path of this pressure stud is limited by a stop pin $y$. The stud P is, as shown in Figs. 1 and 2, provided with a point; the same projects somewhat beyond the rearward nose of the sear releasing arm L.

By pulling back the trigger D the pressure stud P is pushed back; the latter, through the sear releasing arm L, releases the sear R, which releases the hammer G. This release allows the sear R to turn somewhat around its pin. This movement of the sear R allows the sear releasing arm L to rotate, whereby the point of this pressure stud P is able to pass underneath the nose $l^3$ of the sear releasing arm. The latter is thus compelled to assume the position shown in Fig. 2, in which position it is held until the trigger has returned to its normal position. This position of the sear releasing arm L allows the breech slide J to again press the firing mechanism forward after the recoil. With this arrangement the shots can be fired repeatedly, but it is absolutely necessary to pull the trigger after every shot. An automatic succession of shots is impossible. When the trigger D is released the nose of the sear releasing arm L places itself under the point of the pressure stud P, Fig. 1. The stop nose $l^1$ limits the rotary motion of the sear releasing arm L.

The movable main part of the breech slide J receives the firing mechanism, which latter consists of the hammer G with its spring Q, the sear R with its spring S, and the firing pin F.

The hammer G is provided with a lateral nose or roller U which moves the former sliding up the incline or cam surface T on left hand inner side of the stock A, when breech slide J is forced back and there cocks the hammer G (Fig. 2). The hamm G is held in this position by the sear R. this position the nose $l^2$ of the sear releas arm L lies underneath the nose $r$ of the s R, and under the pressure of the trigge the hammer, released by the sear R, str against the firing pin F and thus fires cartridge.

The power of the powder gases pre back the breech slide, the roller U of hammer G slides up the incline or cam T cocks the hammer again. The sprin presses the breech slide forward, which ter introduces a new cartridge into the tridge chamber. This operation is of usual nature.

Fig. 5 shows the automatic safety, making and function of the same being simple. A lever W, the lower part $u$ which projects out of the rear part of stock A, has a stop $w^2$ which, when in position shown in Fig. 5, prevents the ger from being moved.

When the pistol is taken up, the leve automatically assumes, under the pre of the hand, the position indicated by d lines, thereby leaving a clear passage fo movement of the trigger D.

The spring $z$ normally holds the lev in the position shown by full lines.

What I claim as my invention, and c to secure by Letters Patent is:

1. An automatic pistol having a mo breech slide, a firing pin, hammer, sea spring carried by said slide, such ha being suspended from the slide so as capable of oscillation, and being moval firing position independently of the pin, and said hammer having a latera jection or roller, and a slanting cam m ed upon the fixed stock adapted to e said projection or roller during rea movement of the breech slide, where cock the hammer.

2. An automatic pistol having a ro sear releasing arm, a carrier for said arr a pressure stud mounted to engage sai when the carrier is moved by the t1 said arm and pressure stud having sl engaging faces, whereby said stud first said arm to release the hammer and holds said arm out of contact with th so long as the trigger is held back.

3. An automatic pistol having a r sear releasing arm, a carrier for said ar1 a pressure stud mounted to engage sa when the carrier is moved by the trigg arm and pressure stud having sliding ing faces whereby said stud first caus arm to release the hammer and ther said arm out of contact with the sear as the trigger is held back, said pistol having a stock formed with two sides, and a single piece fitting in the rear in between the said sides and constituting the stock, said piece supporting said sear releasing arm, said carrier and said stud whereby said several parts can be removed with said piece.

In witness whereof, I have hereunto signed my name in the presence of two subscribing witnesses.

BRUNO CLARUS

Witnesses:
  J. GRAU,
  CARL RATCHY.